US006234864B1

United States Patent
Onori

(10) Patent No.: US 6,234,864 B1
(45) Date of Patent: May 22, 2001

(54) SOUND PRODUCING DEVICE FOR USE ON A BICYCLE

(76) Inventor: James J. Onori, 3105 Maple La., Davie, FL (US) 33328

( * ) Notice: Subject to any disclaimer, the term of this patent is extended or adjusted under 35 U.S.C. 154(b) by 0 days.

(21) Appl. No.: 09/515,935

(22) Filed: Feb. 29, 2000

(51) Int. Cl.$^7$ ..................................................... A63H 5/00
(52) U.S. Cl. ............................................................. 446/404
(58) Field of Search .............................. 446/81, 397, 404, 446/409; 108/288.4; 24/489, 530

(56) References Cited

U.S. PATENT DOCUMENTS

| | | | |
|---|---|---|---|
| 2,621,664 | * | 12/1952 | Leclabart . |
| 2,624,156 | * | 1/1953 | Meyer . |
| 2,633,097 | * | 3/1953 | Frew . |
| 3,905,151 | * | 9/1975 | Zwiegle ................................ 446/404 |
| 5,226,846 | * | 7/1993 | Onori ..................................... 446/404 |
| 5,611,558 | * | 3/1997 | Randmae .............................. 446/404 |
| 6,039,338 | * | 3/2000 | Perea et al. ........................ 280/288.4 |

* cited by examiner

Primary Examiner—Jacob K. Ackun, Jr.
Assistant Examiner—Jeffrey D. Carlson

(74) Attorney, Agent, or Firm—Malloy & Malloy, P.A.

(57) ABSTRACT

An improved sound producing device, to be attached to the frame of a bicycle adjacent the wheels, the device including a clamp member having a pair of clamp arms, each clamp arm including a head portion and a handle portion at opposite ends thereof. The sound producing device includes an attachment assembly to movably attach the clamp arms to one another at respective mid-sections thereof and to exert a biasing force on the clamp arms causing the clamp heads thereof to be drawn towards one another, requiring that a compressing force be exerted on the handle portions in order to pull the clamp heads apart when engaging or disengaging the device. Located in an interior of each of the clamp heads is a gripper insert which is formed of a high friction, deformable material such that the clamp member will not slip or rotate about the frame of the bicycle during use, and such that frames of varying dimensions may be completely engaged by the gripper inserts, thereby enabling rigid, yet flexible flaps protruding from a distal end of clamp arms to contact the moving spokes of the bicycle wheel resulting in the generation of a motor-like sound. The sound producing device of the present invention preferably also includes a card mounting assembly for permitting the flexible flaps to be readily replaced and/or interchanged with another.

20 Claims, 3 Drawing Sheets

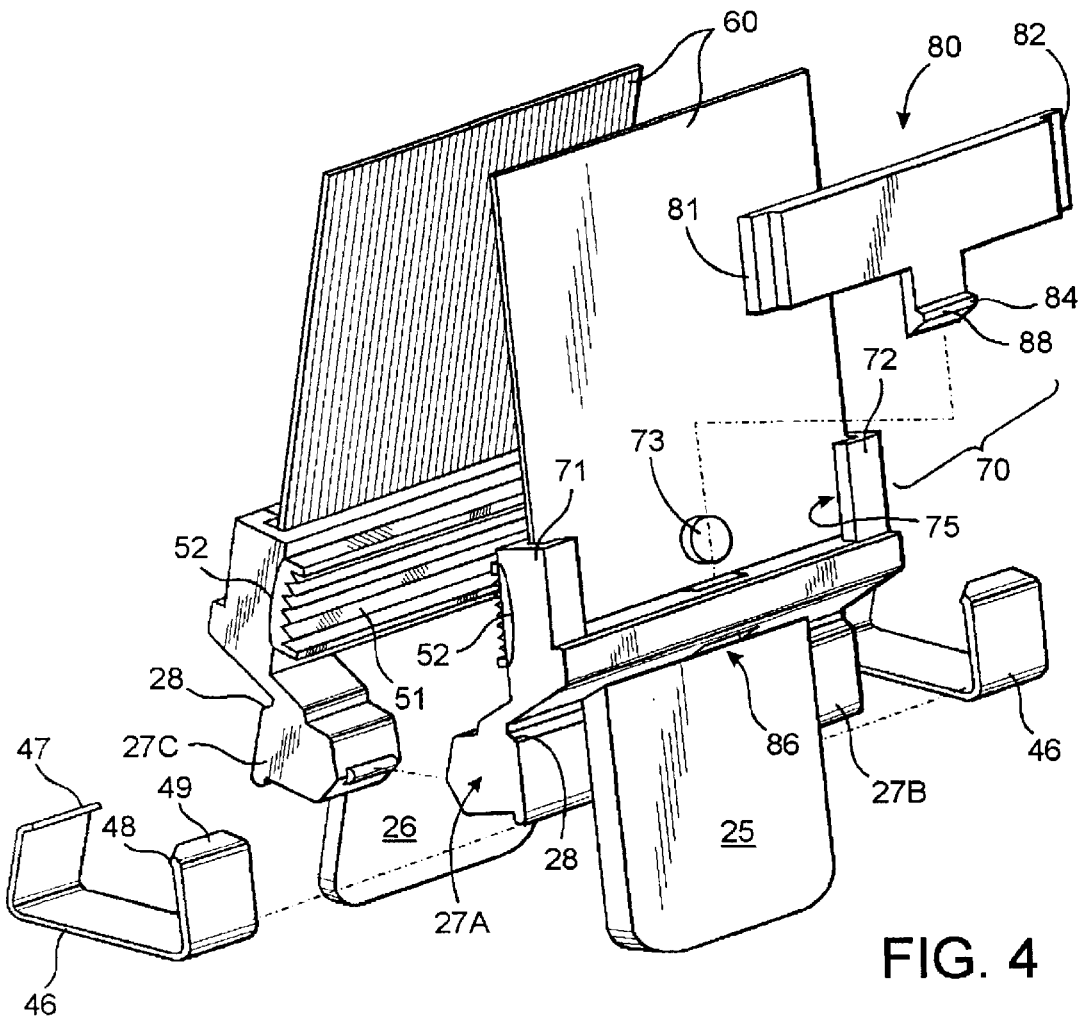
FIG. 4
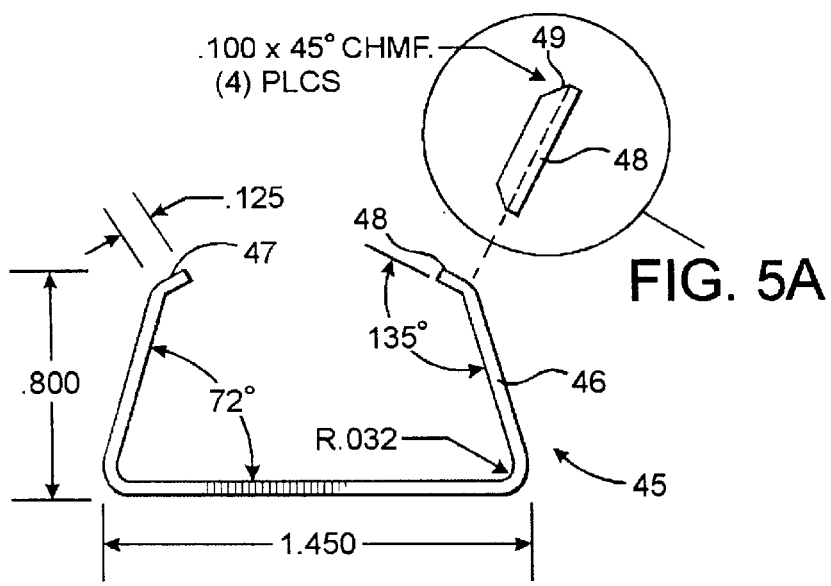
FIG. 5A
FIG. 5

SOUND PRODUCING DEVICE FOR USE ON A BICYCLE

BACKGROUND OF THE INVENTION

1. Field of the Invention

The present invention is directed towards an improved sound producing device intended primarily for, but not limited to, use on a bicycle. More in particular, the present invention is structured to be easily and safely attached to the frame of a variety of different bicycles without the use of any tools, to remain in a fixed position during use, and to be easily removed from a bicycle frame, whenever that it desired. The present invention includes at least one flap or card, and preferably a pair of them, positioned to repeatedly contact the spokes of one of the bicycle wheels, thereby providing and simulating an enjoyable motor-like noise during bicycle riding. In addition, the present invention is structured to permit selective replacement of at least one flap or card, and further, includes an improved attachment and biasing assembly so as to facilitate both the manufacture and assembly of the invention.

2. Description of the Related Art

For a long time, children have attached cards and the like, such as baseball cards, to the frames of their bicycles, such that when they ride their bicycles, the moving spokes on the rotating bike tire repeatedly contact the card and make an enjoyable, motor-like noise. A consistent problem encountered in doing so, however, is that the repetitive, unidirectional force applied by the spokes to the baseball or other card, and to whatever device is used to hold the card, causes the device to rotate about the frame, and thereby, either causes the card to move out of noise making engagement with the spokes or for the device to fall off the bike frame altogether.

While many devices have been designed in the past to utilize the movement of a bicycle to make noise, it is believed that only a few have attempted to address the above-described problem, and even then, in an imperfect manner. For example, a majority of such devices, such as those taught by U.S. Pat. No. 2,633,097 to Frew, U.S. Pat. No. 4,018,450 to Rutledge, U.S. Pat. No. 4,151,677 to Tucker, U.S. Pat. No. 2,914,886 to Barthel, or U.S. Pat. No. 3,131,507 to Richter, include complicated and elaborate designs utilizing clappers, sound boxes, support frames, and the like. In addition, these devices are primarily of a permanent nature, meaning that once they are installed, they are not to be removed. Further, while some have endeavored to offer simpler designs, such as those recited in Sorensen, et al., U.S. Pat. No. 5,085,611,Modlin, U.S. Pat. No. 2,736,136, and Zweigle, U.S. Pat. No. 3,905,151, these are thought to be difficult to install, particularly by children who will be the primary users of such items. As one example, the device of Modlin includes a metallic piece with interlocking clamps, which not only appears to require substantial pressure to install, and which may not be easily removed, but further, which includes potentially dangerous sharp edges, especially to small hands. Also, and as is evidenced by the reference to Zweigle, when the device attempts to utilize a simpler design, it is still subject to the above-described slippage and rotation about the frame of the bicycle, which in addition to frustrating the goal of producing sound, can potentially damage the paint of the bike frame and lead to rust. A device such as that of Zweigle, which includes a wrap around plate having a protruding finger and which is held in place by a cord or band, evidences such difficulties in that it is difficult to quickly and easily install, particularly by a child, and does not remain in a fixed position when subject to the constant impacts of the spokes of a bicycle.

As demonstrated by my invention set forth in U.S. Pat. No. 5,226,846, I have endeavored to create a solution to these and other problems in the art by providing a relatively simple, universally designed device which can be easily and yet reliably attached without any tools to a bicycle frame, such as but not necessarily limited to either the front or the rear of the bike frame, for the purpose of producing the above described enjoyable, motor-like noise. For example, the invention set forth in my U.S. Pat. No. 5,226,846, incorporated herein by reference, is simple to install by any individual, including a child, is easy to remove or reposition without special tools or the help of an adult, and further, is capable of use with a variety of bicycle frames having an assortment of dimensions. As such, my earlier invention is capable of being shared among children on different bicycles.

Even so, there remains a need in the art for a sound producing device for use primarily on bicycles, such as was described in my U.S. Pat. No. 5,226,846, but which offers one or more improvements. For example, it is recognized by the inventor hereof that the flaps or cards which are used with the sound producing device can become worn or bent from their being repeatedly impacted by the spokes of the bicycle wheel, such that the flaps or cards are in need of being replaced. In addition, it is recognized by the inventor hereof that children, particularly those in elementary school, are the curators of whatever is the latest fad, trend and/or fashion, and like to reflect their being "in the know." Thus, it is believed by the inventor hereof that children would like to display and use more than just baseball cards and/or playing cards with my inventive sound producing device, meaning that many children would like to display and use cards or flaps that carry on them some artwork, logos or other indicia embodying the latest fads. By way of example only, such indicia might include, but would in no way be limited to, pictures of a currently "in" movie star or other trendy phenomenon, with some fairly recent examples being the "Pokemon" or "Power Ranger" characters, etc. In view of the foregoing, there remains a need in the art for an improved sound producing device which readily permits the replacement of the card or flaps which contact the spokes of the bicycle wheel, whether because they become worn out from repeated use or because the child wants to display a new card or cards. Alternatively, a child may want to avoid damage to an original printed card that comes with device for collectable purposes and use instead another card of his or her own choosing it its place.

In addition, it is recognized by the inventor hereof that with respect to the manufacture of the sound producing device set forth in my U.S. Pat. No. 5,226,846, there is also room for improvement in certain of the structural components so as to facilitate and reduce the costs associated with production and/or the assembling of the finished product. As an example, it would be ideal if the sound producing device of my previous invention were further developed to include an improved attachment and biasing assembly so as to facilitate the manufacture and/or assembly of the invention. As another example, it would be ideal if the sound producing device of my previous invention were further developed to eliminate attaching the card or flap to the device with an adhesive, which typically requires during production that a well-ventilated area be provided, and as such, this type of a feature would avoid unnecessary interruption in the assembly and/or production process, and provide some other savings relating to labor cost.

SUMMARY OF THE INVENTION

The present invention is designed to address and present a solution to these and other needs which remain in the art. In particular, the present invention is directed towards a sound producing device, intended primarily for being attached to the frame of a bicycle, which readily permits the replacement of the card or flaps which contact the spokes of the bicycle wheel, whether by a child or an adult, and further, which includes an improved attachment and biasing assembly so as to facilitate the manufacture and/or assembly of the invention.

As will become more clear from the detailed description of the preferred embodiments, and the attached drawings, the improved sound producing device of the present invention comprises a clamp member having a pair of clamp arms. The clamp member is preferably, but not necessarily, integrally formed such as by an injection molding process, with each of the clamp arms preferably including a clamp head at one end thereof and a handle portion at an opposite end thereof. In addition, the clamp arms are preferably movably attached to one another such that the interior portions of the clamp head correspondingly face one another, and essentially are ambidextrous in design so as to allow for the creation of a single tool or dye in creating both clamp arms for the device. In the preferred embodiments, the clamp arms are pivotally secured to one another by an improved attachment assembly disposed at or near their respective mid-sections. This improved attachment assembly is additionally structured to exert a biasing force on the clamp arms, resulting in the clamp heads being drawn together, unless an inwardly directed force is exerted on the handle portions to cause the clamp heads to separate.

The present invention also comprises a gripper structure universally designed for securely gripping various shapes and diameters and yet protecting the bicycle frame to which the device is attached. The gripper structure is preferably disposed on an interior surface of each of the clamp heads, and further, each of the gripper inserts is preferably formed of a high friction, deformable, resilient material adapted to conform with and apply a gripping force to the bicycle frame.

The present invention can, and in most embodiments will, include at least one, substantially rigid, yet flexible flap or card protruding from a generally distal end of the clamp head. This flap or card is at least somewhat elongate, and preferably, substantially elongate, such that when the clamp head is disposed around the forks of the tire holding portion of the bicycle frame, the flap will contact the moving spokes of the bicycle and result in a motor-like noise being generated while the wheels of the bike are turning.

It is an object of the present invention to provide an enjoyable sound-producing device for use with a bicycle which is easy to install and remove, including preferably, by a child.

Yet another object of the present invention is to provide a sound producing device for installation on a bicycle which will not easily rotate, such that reorientation of the device is generally not required, even after repeated impacts with the spokes of the bicycle.

Still another object of the present invention is to provide an easily installed sound producing device which can be utilized with bicycles having frames of varying dimensions, including various shapes and diameters.

It is also an object of the present invention to provide an improved sound producing device which is structured to readily permit the card or flaps used with the device to contact the spokes of the bicycle wheel to be replaced.

Yet another object of the present invention is to provide a sound producing device which includes an improved attachment assembly for movably joining together each of the clamp arms which define the clamp member and for exerting a biasing force thereon to cause the clamp heads thereof to be normally drawn together.

BRIEF DESCRIPTION OF THE DRAWINGS

For a fuller understanding of the nature of the present invention, reference should be had to the following detailed description taken in combination with the accompanying drawings in which:

FIG. 4 is an exploded view of the sound producing device in accordance with a preferred embodiment of the present invention.

FIG. 5 is a perspective view of an improved attachment and biasing assembly in accordance with the present invention.

FIG. 5A is an isolated view illustrating a preferred feature of the attachment and biasing assembly illustrated in FIG. 5.

Like reference numerals refer to like parts throughout the several views of the drawings.

DETAILED DESCRIPTION OF THE PREFERRED EMBODIMENT

Figure 1:
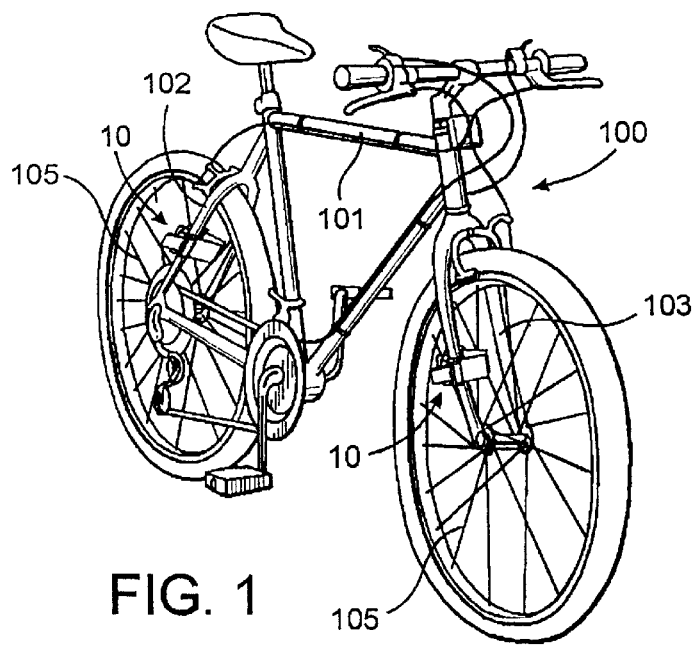
FIG. 1 is a perspective view of the sound producing device attached towards the rear of a frame of one of many possible types of bicycles, with another device attached to the front of the frame as well.

As shown in FIG. 1, the present invention is directed generally towards an improved sound producing device, indicated by 10, which is primarily designed to be attached to the frame 101 of a bicycle 100. More particularly, the sound producing device 10 is preferably to be attached at the rear fork 102 or front fork 103 of the bicycle frame 101 such that the sound producing device 10 may contact the spokes 105 of the bicycle wheel to produce a repetitive, clapping and somewhat motor-like sound.

Figure 2:
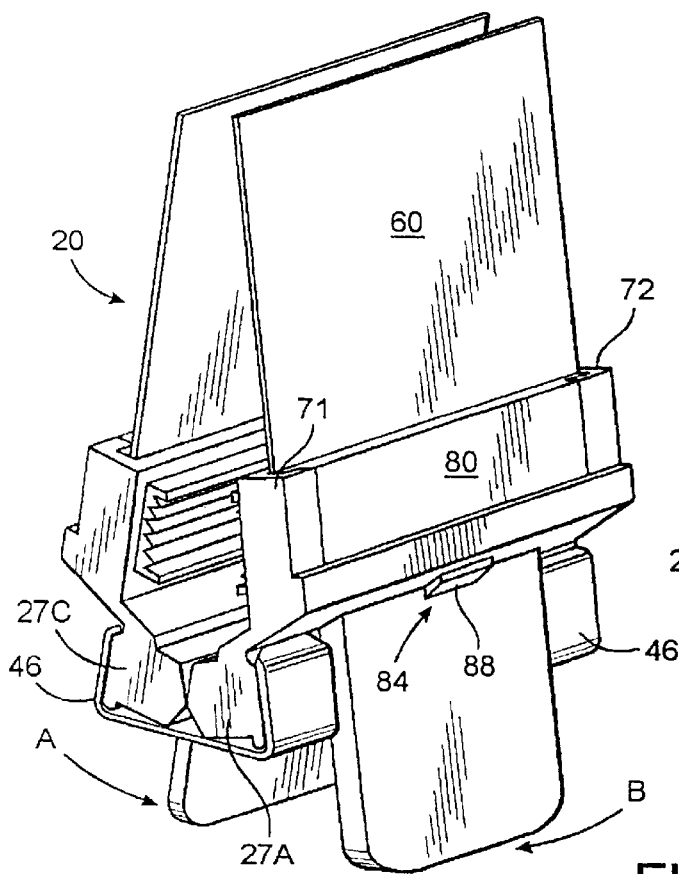
FIG. 2 is a perspective view of an improved sound producing device according to the present invention.
Figure 3:
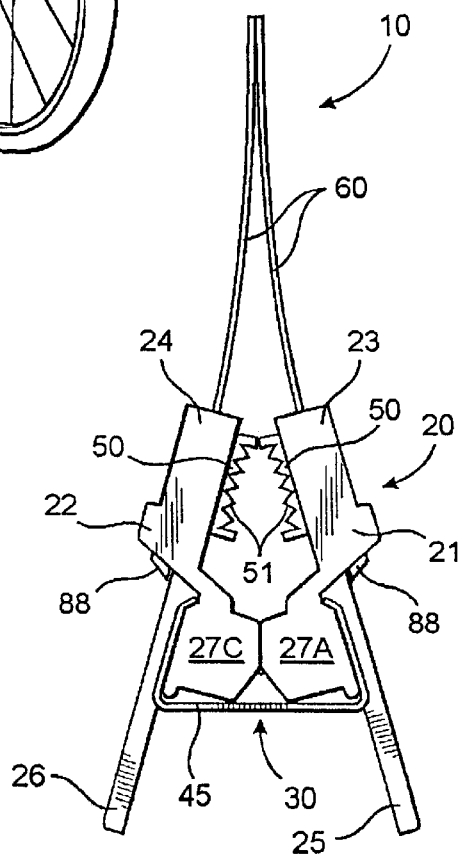
FIG. 3 is a side view of the invention shown in FIG. 2.

Referring now to FIGS. 2–3, the improved sound producing device 10 of the present invention is seen to comprise a clamp member 20. The clamp member 20, which may be, but does not have to be, integrally formed, includes a pair of oppositely disposed clamp arms 21 and 22. Each of the clamp arms 21 and 22 are formed of a suitably rigid material, such as ABS plastic although a metallic material, urethane based material or other materials could also be used. In addition, each of the clamp arms 21, 22 preferably includes a clamp head, 23 and 24, disposed generally at a distal end thereof and a handle portion 25 and 26 disposed generally at proximal ends thereof. In the preferred embodiments the clamp arms 21 and 22 are movably connected, and most preferably, pivotally attached together at a mid-section thereof by way attachment means, generally indicated as 30, for pivotally holding the clamp arms 21 and 22 together. In previous and/or other embodiments, the invention can include separate biasing means for exerting a biasing force on the clamp arms 21 and 22, such that the clamp heads 23 and 24 are normally drawn towards each other as illustrated in FIG. 3, and such that a compressing force is required to be exerted on the handle portions 25 and 26 in order to separate the clamp heads 23 and 24 for attachment or removal of the device to or from the bicycle 100. It is pointed out that although the clamp heads 23 and 24 may be shown in some of the drawings in a slightly separated position, they would normally contact one another, as shown in FIG. 3, when not secured about a rigid object such as the bicycle frame 101. Accordingly, the attachment means and biasing means are structured to ensure that the clamp member will securely and snugly fit about the frame of 101 of the bicycle 100.

With reference now to FIG. 5, the attachment means 30 and biasing means ideally comprise an improved attachment and biasing assembly 45. More in particular, the improved attachment and biasing assembly comprises a clip structure 46 having somewhat of a "U" shape and formed of a rigid material, such as but not limited to a strong metallic material. The improved attachment and biasing assembly 45 is structured to attach to a lower exposed surface on each of the clamp arms 21, 22 and to movably join them together. More in particular, each of the clamp arms 21 and 22 is preferably structured to include a shoulder portion, and ideally a pair of shoulder portions as at 27a, 27b, 27c and 27d, with each shoulder portion being sized and configured to generally correspond to the clip structure 46 in order that one end zone of a clip structure 46 may be snugly engaged about correspondingly positioned shoulder portions, such as 27a and 27c, as shown in FIG. 2. The clip structure 46 is additionally structured and disposed to exert a biasing force on the clamp arms 21 and 22, such that the clamp heads 23 and 24 are normally drawn towards each other as illustrated in FIG. 3, and such that a compressing force is required to be exerted on the handle portions 25 and 26, in the directions of the arrows A and B of FIG. 2, in order to separate the clamp heads 23 and 24 for attachment or removal of the device to or from the bicycle 100. As illustrated in FIG. 2, the present invention will preferably include two of the clip structures 46, with one disposed at generally opposite sides of each clamp arm adjacent the handle portions 25 and 26. Ideally, and as illustrated in FIG. 5-A, each opposite end, 47 and 48, of the clip structure 46 may be contoured as at 49, so as to eliminate sharp edges and thereby, prevent injury. It is pointed out that with this embodiment, the exterior surface of each clamp arm 21, 22 and preferably each shoulder portion 27 in particular, will preferably include a ridge or groove formed thereon, as at 28, in order that an end 47 or 48 of the clip structure 46 will be snugly received therein, which feature should further serve to resist the repeated vibrations that the device 10 will undergo in use on a bicycle 100. It is also pointed out that this embodiment of an improved attachment and biasing assembly 45 permits each of the clamp arms 21, 22 to be manufactured essentially by way of a single tooling process, which not only requires significantly less tooling than previous embodiments, but further, which produces a plurality of identical clamp arms that can be paired together and assembled to form the invention, 10.

The present invention also comprises a gripper structure designed for securely gripping the bicycle frame 101 to which the device 10 is attached. In the preferred embodiments, the gripper structure comprises a pair of gripper inserts 50. These gripper inserts 50, which are secured within a pair of recesses 52 in an interior of each of the clamp heads 23 and 24, as best seen in FIG. 4, are made of a high friction, deformable material, such as rubber or another material exhibiting such characteristics, and as such, during use the sound producing device 10 will be substantially, if not completely prevented from rotating about its point of attachment to the frame 101 of the bicycle 100, despite there being repeated contact and/or impacts of the device 10 with the spokes 105 of the bicycle wheel. Each of the gripper inserts 50 also preferably includes a grooved exterior surface 51 to further facilitate a snug and secure fit at all points of contact with the bicycle 100, such that bicycles of varying frame thicknesses or even bicycles having tapered frame portions which vary in diameters will be at least close to being fully engaged at all points of attachment, despite the variations of diameter. It is pointed out that the preferred gripper inserts 50, while enabling a snug engagement and/or attachment of the device 10 to a variety of bicycle frames, are nevertheless structured to not scratch the paint on or otherwise compromise the bicycle frame 100.

Protruding from generally the distal end, adjacent the clamp heads 23 and 24, of at least one of the clamp arms, such as 21, is a substantially rigid, yet flexible flap or card 60. of course, it is preferred that the device 10 utilize a pair of such cards or flaps 60, with one temporarily secured at the distal end of each of the clamp arms, 21 and 22. These cards or flaps 60 are ideally made, but do not have to be made, of that material from which playing cards and/or baseball cards are made, usually one that includes a plasticized covering or which are themselves made from a plastic material, in order that they may bend upon contact with the spokes 105 of the bicycle wheel, make a substantial clicking or slapping type of noise each time that one of the spokes 105 of the bicycle wheel strikes them, and further, return to their original, substantially flat orientation after impact. As has been described with reference to a previous and/or alternative embodiment, these flaps 60 may be secured within a groove formed in the distal region of each of the clamp arms 21 and 22, with each such groove extending along an entire or substantial length of each clamp arm 21 and 22 and being structured to securely receive an edge of each of the flaps 60, such that the flaps 60 will not slide out of the grooves 61 and 62 during impacts with the spokes 105 of the bicycle 100.

Figures 6, 7, 8:
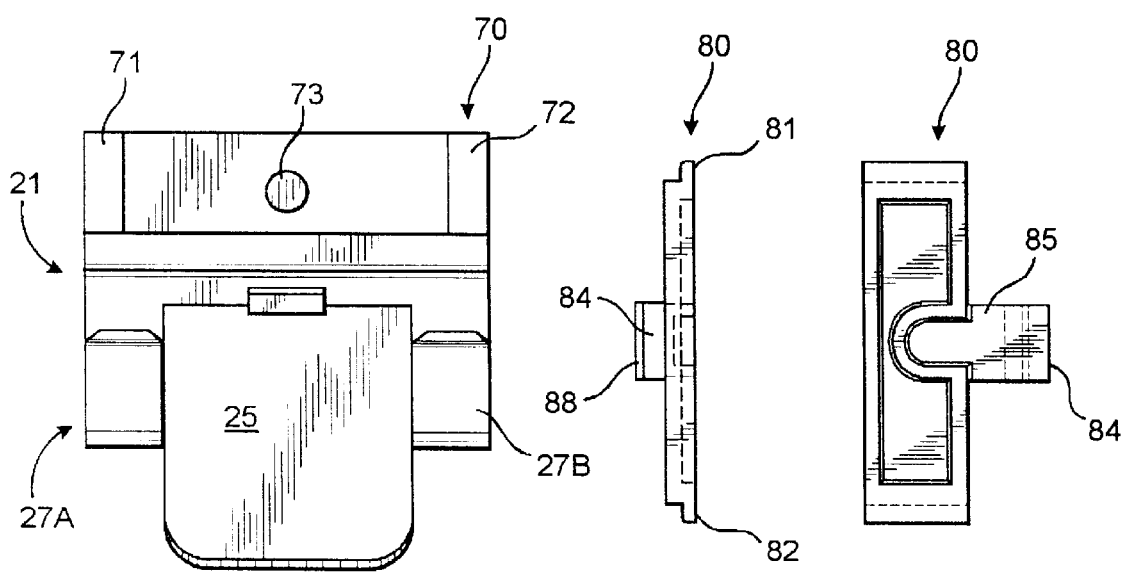
FIG. 6 is a side view of one of the clamp members shown in FIG. 4 with the cover member removed therefrom so as to illustrate a preferred card mounting assembly.
FIG. 7 is a side view of the exterior surface of a more preferred cover member.
FIG. 8 is a side view of the interior facing surface of the cover member illustrated in FIG. 7.

With reference now to FIGS. 6–8, an improved embodiment of the sound producing device 10 is illustrated, wherein the cards or flaps 60 which contact the spokes 105 of the bicycle wheel can be readily replaced, whether because they become worn out from repeated use or because the child wants to display a new card or cards. More in particular, the distal region of each of the clamp arms 21 and 22 is preferably structured to include a card mounting assembly 70 for permitting and facilitating the replacement of the card or flap 60. With reference to FIGS. 4 and 6, the card mounting assembly 70 comprises an elongated groove 75 formed within the distal end zone of the clamp member and extending substantially across the transverse length thereof. The elongate groove 75 is structured to securely receive an edge of each of the cards or flaps 60, and more preferably, is additionally or alternatively defined as a channel within and/or by a pair of oppositely disposed side portions 71 and 72, in order that an end zone of the card or flap 60, and not just an edge, is securely received therein. Ideally, the card mounting assembly 70 additionally comprises a post member 73 formed on and protruding outwardly from an inner surface of each clamp member's distal region, which is sized and configured to extend and yet cooperate within the above described channel. The post member 73, which may be centrally disposed on the clamp head 21 or 22, is structured to receive thereon and/or mate with an aperture formed on an end zone of the card or flap 60 at a correspondingly positioned location, and as such, serves to more securely, and yet temporarily mount a card 60 to the clamp head 21 or 22, and prevent rotation of the card within the device 10, despite its being repeatedly contacted by the spokes 105 of the bicycle 100.

To further ensure the secure yet temporary mounting of a card 60 within the device, the card mounting assembly 70 preferably also comprises a cover member 80. The cover member 80 is preferably sized, configured and dimensioned, as seen in FIGS. 2 and 3, to slide into the elongate groove and/or channel 75 defined at the distal region of each clamp member and further, to offer a neat, aligned and aesthetically pleasing appearance. More in particular, and as shown in FIG. 7, the cover member 80 includes a pair of oppositely disposed side walls, as at 81 and 82, which may have a stepped configuration so as to be slidable into and snugly received within respective ones of the side portions 71, 72 of the clamp member 21. The cover member 80 preferably also includes a latch member, 84, that is structured to be matingly and securely yet releasably received within a cooperatingly structured aperture 86 formed on the clamp member 21, as is perhaps best shown in FIG. 4. With reference to FIG. 8, the inwardly facing surface of the cover member 80 preferably includes a recess or slot 85 for slidingly receiving the post member 73 therein, which recess or slot can be configured to relatively snugly receive the post member 73 in order to further aid with preventing the rotation of the clamp member despite its being indirectly impacted by the spokes 105 of the bicycle 100. It is pointed out that in order to remove the cover member 80 from the intended operative position shown in FIGS. 2 and 3, such as for the replacement of a card or flap 60, the distal end 88 of the latch member 84 is merely depressed and the cover member 80 pushed upwardly so that the latch 84 is slid out of engagement with aperture 86 of clamp member 21, whereupon the cover member 80 can be easily removed from the side portions 71 and 72 of the mounting assembly 70.

The present invention has been described in detail above so as to illustrate certain preferred embodiments to accomplish the claimed structure of the sound producing device. However, it is to be understood that modifications, variations and/or other changes can be made to the described preferred embodiments of the invention, but which would still be consistent with and fall within the spirit and scope of the present invention. Thus, it is specifically intended and pointed out that all matters in the foregoing description and shown in the accompanying drawings be interpreted as merely being illustrative and should not be construed in a limiting sense, such that the scope of the invention should be determined not only by the appended claims but also by their legal equivalents, as may be deemed appropriate and consistent with the judicially created doctrine of equivalents.

Now that the invention has been described,
What is claimed is:

1. To be attached to the frame of a bicycle, the bicycle frame being of varying dimensions at different sections thereof and the bicycle including at least one tire having a plurality of spokes which move during rotation of the tire, a sound producing device comprising:

a clamp member, said clamp member including a pair of arms, said arms including a clamp head and a handle portion at opposite ends thereof, an attachment assembly structured to movably connect said arms to one another and to exert a biasing force on said arms such that said clamp heads are biased towards one another in a clamping position, a gripper structure disposed in an interior of each of said clamp heads, said gripper structure being formed of a high friction, resilient material so as to substantially conform to the varying dimensions of the bicycle frame, while restricting movement of said clamp member relative to the bicycle frame during use, at least one substantially rigid, yet flexible flap protruding from a distal end, adjacent said clamp head, of at least one of said arms, said flap being substantially elongate so as to contact the moving spokes of the bicycle, an elongate groove disposed in said distal end of each of said clamp arms, said elongate groove being structured and disposed receiving an edge of said flap securely therein, a latch member structured to be matingly and yet releasably received within a cooperatingly structured aperture formed on said clamp member.

2. A device as recited in claim 1 including two of said flaps, one protruding from each of said clamp arms.

3. A device as recited in claim 2 wherein said gripper structure includes a grooved exterior surface structured to engage and grip the bicycle frame.

4. A device as recited in claim 3 wherein said handle portions include a ridged exterior surface structured and disposed to facilitate gripping and squeezing thereof.

5. A device as recited in claim 4 wherein said attachment assembly comprises a clip structure.

6. A device as recited in claim 5 wherein each of said arms of said clamp member includes a shoulder portion, and said clip structure is attached to engage each of said shoulder portions.

7. A device as recited in claim 6, wherein said clamp member includes a pair of clip structures, each of said clip structures attached at generally opposite sides of each clamp arm and adjacent to said handle portions.

8. A device as recited in claim 1 wherein said attachment assembly is structured to pivotally connect said arms to one another at a mid-section thereof.

9. A device as recited in claim 8 wherein said attachment assembly includes a generally "U" shaped clip structure.

10. A device as recited in claim 9 wherein said attachment assembly is made of metal.

11. To be attached to the frame of a bicycle, the bicycle frame being of varying dimensions at different sections thereof and the bicycle including at least one tire having a plurality of spokes which move during rotation of the tire, a sound producing device comprising:

a clamp member, said clamp member including a pair of arms, each of said arms including a clamp head and a handle portion at opposite ends thereof, an attachment assembly structured to pivotally connect said arms to one another at a mid-section thereof and to exert a biasing force on said arms such that said clamp heads are normally drawn towards one another and define a clamping position, a gripper assembly disposed in an interior of each of said clamp heads, said gripper assembly being structured to substantially conform to the varying dimensions of the bicycle frame, while restricting movement of said clamp member relative to the bicycle frame during use, at least one substantially rigid, yet flexible flap protruding from a distal end, adjacent said clamp head, of at least one of said arms, said flap being substantially elongate so as to contact the moving spokes of the bicycle, a card mounting assembly disposed on said distal end of each of said clamp arms, said mounting assembly being structured and disposed to receive at least an edge of said flap securely therein and to permit selective replacement of said flap, said card mounting assembly including a cover member, and said cover member including a latch member structured to be matingly and yet releasably received within a cooperatively structured aperture formed on said clamp member.

12. A device as recited in claim 11, wherein said card mounting assembly comprises an elongated groove formed within said distal end zone of said clamp member and extending substantially across the transverse length thereof.

13. A device as recited in claim 11, wherein said card mounting assembly comprises a pair of oppositely disposed side portions formed to at least partially define an elongate channel within said distal end zone of said clamp member.

14. A device as recited in claim 13, wherein said elongate channel is structured to receive an end zone of said flap.

15. A device as recited in claim 14 wherein said card mounting assembly additionally comprises a post member.

16. A device as recited in claim 15 wherein said post member is centrally disposed on said clamp head and is structured to mate with an aperture formed on said end zone of said flap.

17. A device as recited in claim 11 wherein said card mounting assembly comprises a post member.

18. A device as recited in claim 13 wherein said card mounting assembly comprises said cover member sized and configured to be sliding received within said elongate channel.

19. A device as recited in claim 11 further comprising a post member centrally disposed on said clamp head and structured to mate with an aperture formed on said end zone of said flap.

20. A device as recited in claim 19 wherein an inwardly facing surface of said cover member includes a recess structured to slidingly receiving said post member therein.

* * * * *